(12) United States Patent
Yamashita

(10) Patent No.: US 6,862,346 B2
(45) Date of Patent: Mar. 1, 2005

(54) SYSTEM DATA SHARING MANAGEMENT SYSTEM IN LAN TELEPHONE SYSTEM

(75) Inventor: Tetsuya Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 262 days.

(21) Appl. No.: 10/091,468

(22) Filed: Mar. 7, 2002

(65) Prior Publication Data

US 2002/0129131 A1 Sep. 12, 2002

(30) Foreign Application Priority Data

Mar. 8, 2001 (JP) .................................... 2001-065663

(51) Int. Cl.$^7$ ............................................. H04M 11/00
(52) U.S. Cl. ................... 379/90.01; 379/102.02
(58) Field of Search ..................... 379/90.01, 93.01, 379/102.01, 102.02, 93.17

(56) References Cited

U.S. PATENT DOCUMENTS

2001/0033565 A1 * 10/2001 Rogers ....................... 370/352

* cited by examiner

Primary Examiner—Stella Woo
(74) Attorney, Agent, or Firm—Young & Thompson

(57) ABSTRACT

A system data sharing management system in a LAN telephone system 10 comprises: a plurality of terminals 201 to 20n connected to a LAN transmission line 300; and a terminal management device 100 for managing system data 400 of each terminal. At least a part 420 of the system data 400 for operating the LAN telephone system 10 is shared by the terminals 201 to 20n and the terminal management device 100. Each of the terminals 201 to 20n can change the shared system data 420.

21 Claims, 5 Drawing Sheets

400 DATA OF LAN TELEPHONE SYSTEM

| CLASS | DATA | | | | |
|---|---|---|---|---|---|
| 1 | SERVICE | NUMBERING PLAN | | | |
| 2 | LCD (SENDING AND RECEIVING/IN COMMUNICATION) | LED | LINE BUTTON | TONE | VOICE COMPRESSION |
| 3 | INCOMING SOUND | LCD (SCREEN OF WAITING) | | | |

410 — (row 1)
420 — (row 2)
430 — (row 3)

FIG.3(a)

420 CLASS 2 DATA

| CLASS | DATA | | | | |
|---|---|---|---|---|---|
| 2 | LCD (SCREEN OF SENDING AND RECEIVING/ IN COMMUNICATION) | LED | LINE BUTTON | TONE | VOICE COMPRESSION |
| ... | ... | ... | ... | ... | ... |
| 2 | LCD (SCREEN OF SENDING AND RECEIVING/ IN COMMUNICATION) | LED | LINE BUTTON | TONE | VOICE COMPRESSION |

421 (first data row)
42n (last data row)

FIG.3(b)

SYSTEM DATA SHARING MANAGEMENT SYSTEM IN LAN TELEPHONE SYSTEM

BACKGROUND OF THE INVENTION

1. Field of the Invention

The present invention relates to a management system for system data sharing, which is necessary for operating a LAN telephone system. More particularly, it relates to a system data sharing management system in a LAN telephone system, which enables system data to be changed at each LAN telephone terminal.

2. Description of the Related Art

There has recently been developed a so-called LAN telephone system, which is composed of a plurality of terminals connected to a LAN transmission line, and a terminal management device having system data for operating the LAN telephone system.

Conventionally, in such a LAN telephone system, the system data necessary for operating the LAN telephone system has been unitarily managed by a server as the terminal management device.

That is, in the conventional LAN telephone system, the system data is temporarily uploaded at the server side, and changing of the system data is allowed only from the server side.

The system data that has properly been uploaded or changed is then downloaded by each LAN telephone terminal, and made valid at each terminal.

However, in such a LAN telephone system, changing of the system data from the LAN telephone terminal side has not been allowed.

It is because since the system data is not shared, access cannot be made to the system data from each LAN telephone terminal, and access can be made to the system data only from the server side and changed.

SUMMARY OF THE INVENTION

An object of the present invention is to provide a system data sharing management system in a LAN telephone system, which enables system data to be changed at each LAN telephone terminal.

In accordance with the present invention, there is provided a system data sharing management system in a LAN telephone system, comprising: a plurality of terminals connected to a LAN transmission line; and a terminal management device for managing system data of each terminal. The system data sharing management system of the present invention further comprise unit for sharing at least a part of system data for operating the LAN telephone system between each terminal and the terminal management device.

BRIEF DESCRIPTION OF THE DRAWING

FIG. 3(a) is a view showing a structure of system data of each LAN telephone terminal, which is managed by the terminal management device of the embodiment of the present invention;

FIG. 3(b) is a view showing a specific structure of class 2 data 420 of the embodiment of the present invention;

DETAILED DESCRIPTION OF THE PREFERRED EMBODIMENTS

Next, description will be made of a method and a system for controlling priority class setting of a communication packet according to an embodiment of the present invention with reference to FIGS. 1 to 9.

Figure 1:
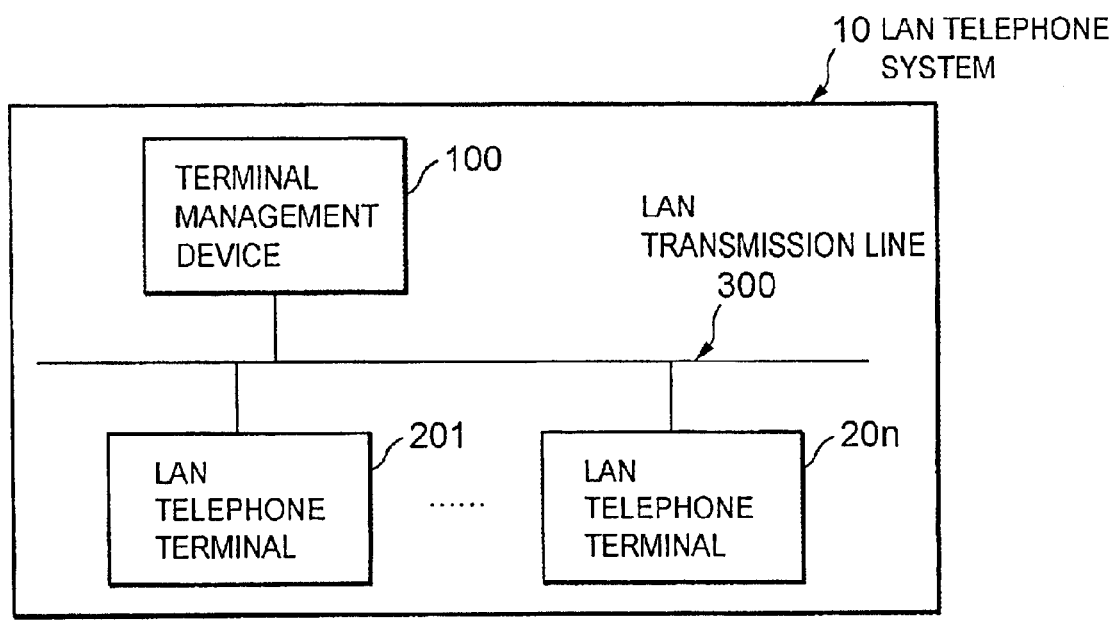
FIG. 1 is a view showing a configuration of a LAN telephone system, which uses a system data sharing management system according to an embodiment of the present invention.

FIG. 1 is a block diagram showing a configuration of a LAN telephone system, which uses a system data sharing management system of an embodiment. A LAN telephone system 10 includes a terminal management device 100, a plurality of LAN telephone terminals 201 to 20n as terminals, and a LAN transmission line 300 for connecting the terminal management device 100 with the LAN telephone terminals 201 to 20n.

Figure 2:
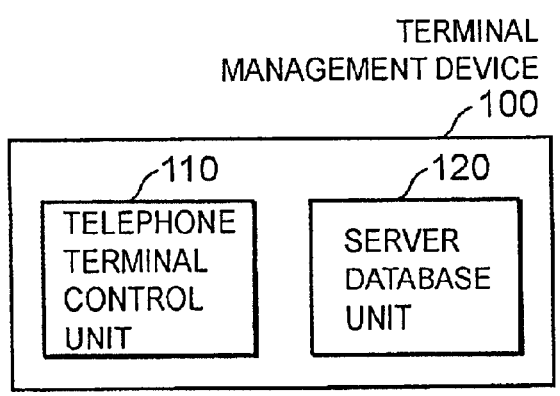
FIG. 2 is a view showing a configuration of a terminal management device of the embodiment of the present invention.

The terminal management device 100 includes, as shown in FIG. 2, a telephone terminal control unit 110, and a server database unit 120. The telephone terminal control unit 110 controls registration or a telephone operation of the LAN telephone terminal. The server database unit 120 manages system data 400 (described later) in the LAN telephone system.

As shown in FIG. 3(a), the system data 400 is classified into three classes: class 1 data (manager data) 410, class 2 data (shared data) 420, and class 3 data (terminal data) 430. The LAN telephone system 10 is operated based on these system data 410, 420 and 430.

The class 1 data 410 can be changed only by the terminal management device 100, and is used to set the entire system, for example services, a numbering plan or the like provided in the LAN telephone system 100.

The class 2 data 420 can be changed by the terminal management device 100 and each of the LAN telephone terminals 201 to 20n. As shown in FIG. 3(b), for each of data 421 to 42n, the class 2 data 420 is used to set data, which affects not the system but call control, such as "LCD (screen of sending and receiving/in communication) and LED, number allocation to a line button, or voice compression" of each of the LAN telephone terminals 201 to 20n.

The class 3 data 430 can be changed only by each of the LAN telephone terminals 201 to 20n. This class 3 data 430 is used to carry out setting of terminal's own, which does not affect "incoming sound, LCD (screen of waiting)" of each of the LAN telephone terminals 201 to 20n.

The server database unit 120 manages the class 1 data 410, and the class 2 data 420 for each of the LAN telephone terminals 201 to 20n, and holds only a default value regarding the class 3 data 430.

Figure 4:
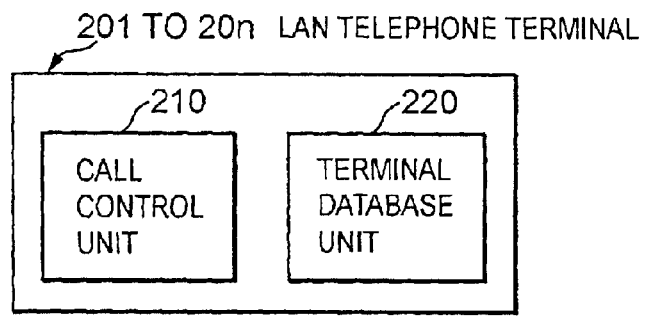
FIG. 4 is a view showing a configuration of the LAN telephone terminal of the embodiment of the present invention.

On the other hand, as shown in FIG. 4, each of the LAN telephone terminals 201 to 20n includes a call control unit 210, and a terminal database unit 220.

The LAN telephone terminals 201 to 20n may be network computers respectively connected to the LAN transmission line 300.

Here, the call control unit 210 controls registration or a telephone operation in the terminal management device 100.

The terminal database unit 220 manages the class 2 data 420 and the class 3 data 430, and can change the data. However, regarding the class 1 data 410, the terminal database unit 220 only holds the data, but cannot change the data.

In addition, the class 2 data 420 is managed as data 421 to 42b corresponding to each of the LAN telephone terminals 201 to 20n.

Next, description will be made of system data sharing management performed by the system data sharing management system in the LAN telephone system of the embodiment with reference to flowcharts of FIGS. 5 to 9.

Figure 5:
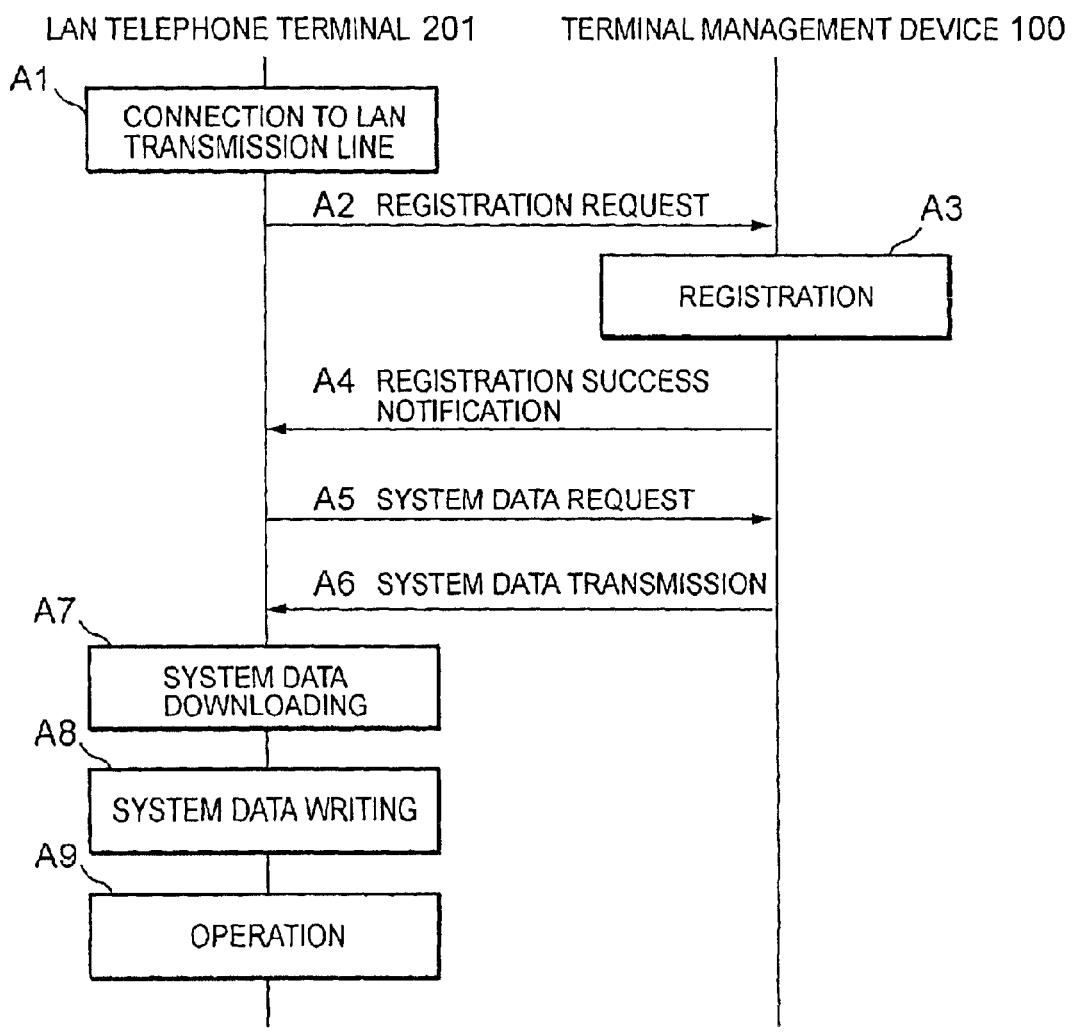
FIG. 5 is a flowchart showing an operation in starting-up of the LAN telephone terminal in the embodiment of the present invention.
Figure 6:
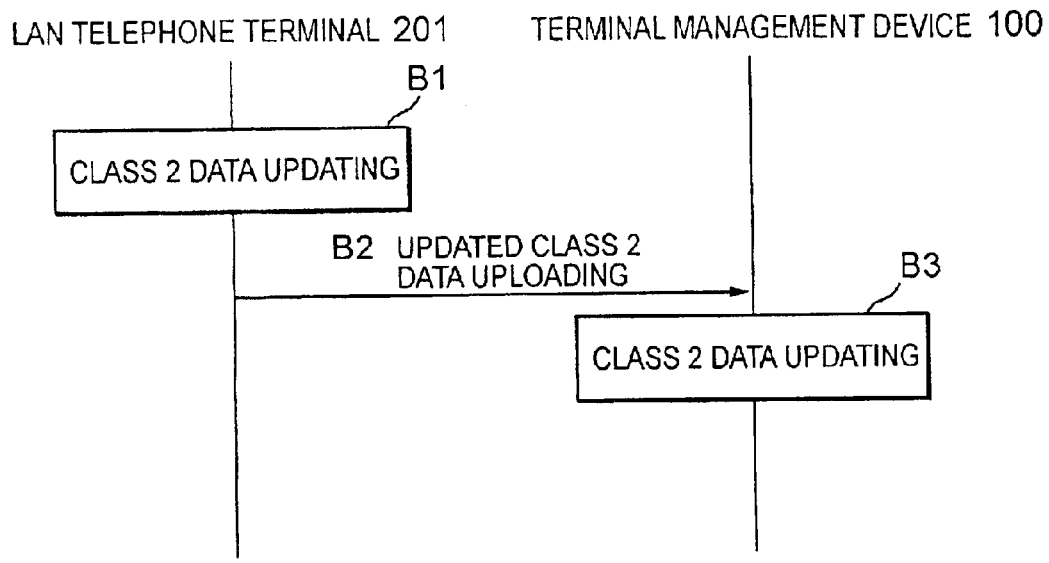
FIG. 6 is a flowchart showing an operation in shared data changing at the LAN telephone terminal of the embodiment of the present invention.
Figure 7:
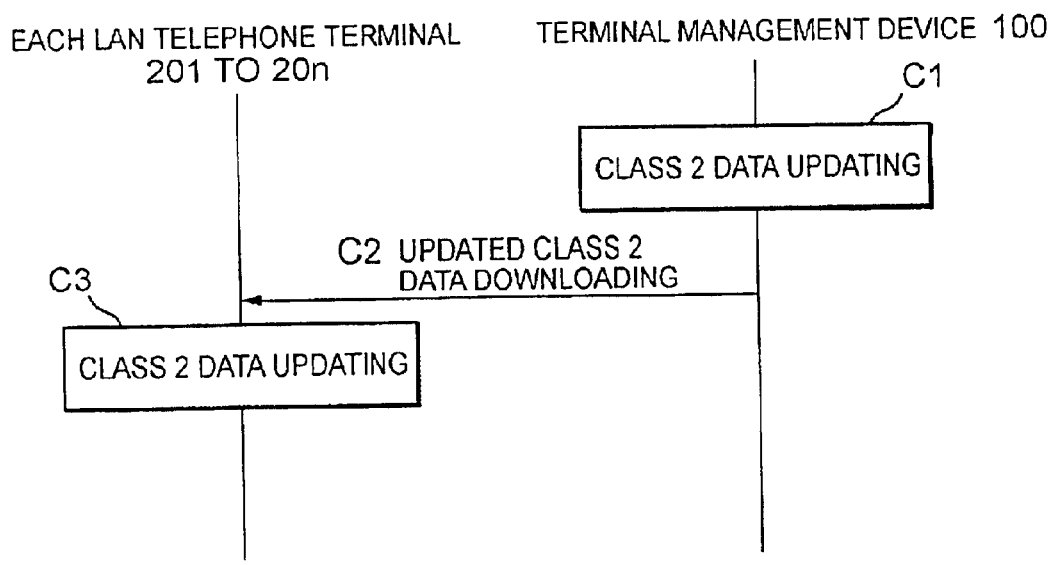
FIG. 7 is a flowchart showing an operation in shared data changing at the terminal management device of the embodiment of the present invention.
Figure 8:
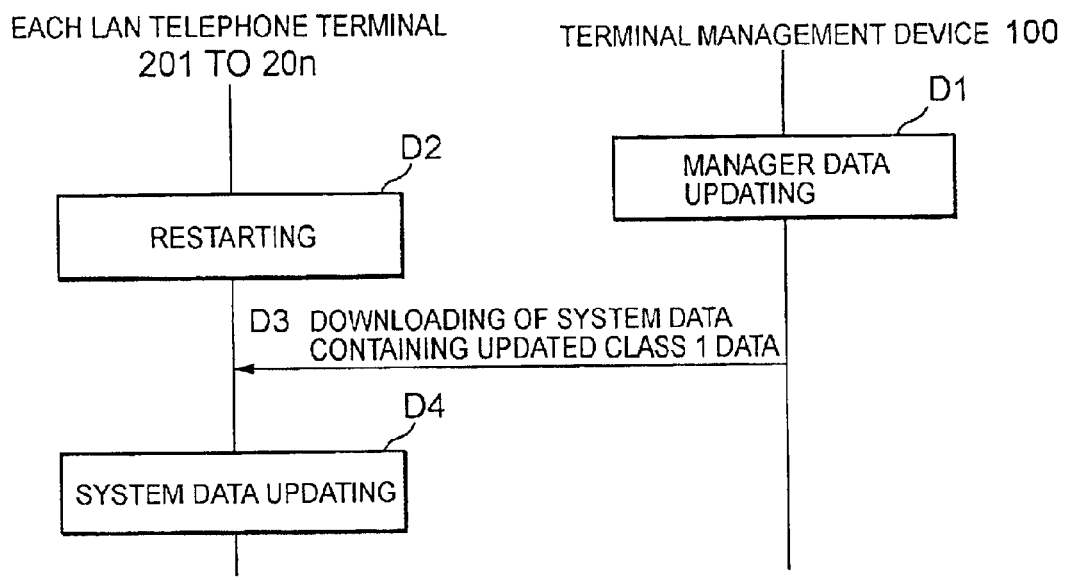
FIG. 8 is a flowchart showing an operation in manager data changing in the embodiment of the present invention.
Figure 9:
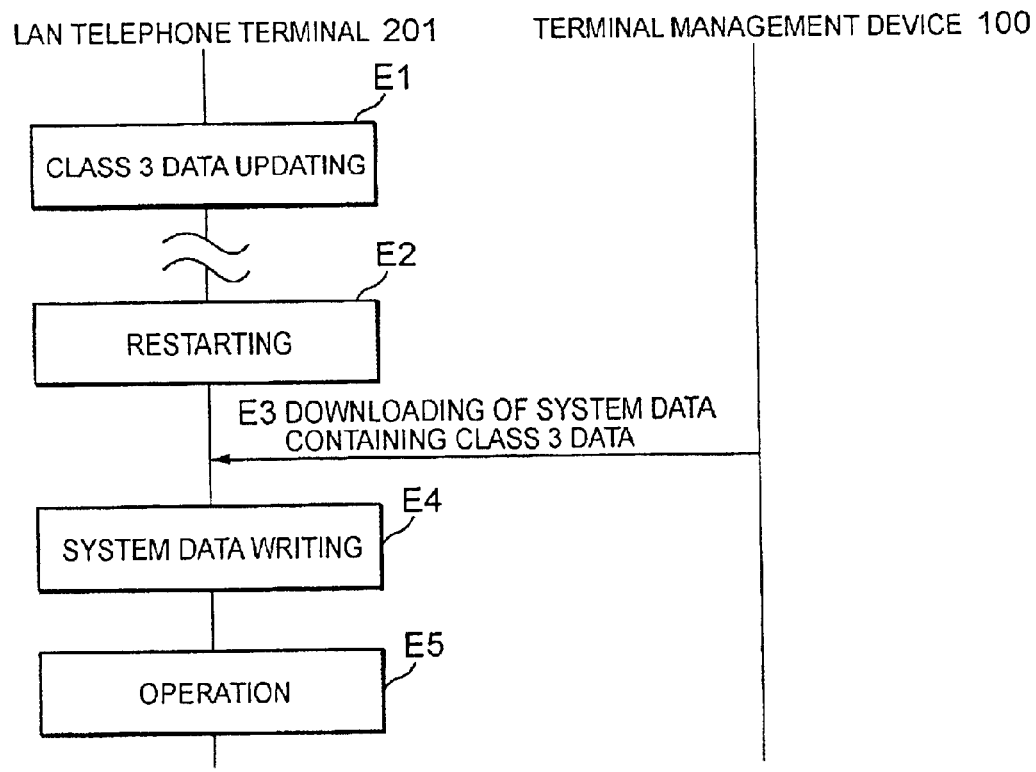
FIG. 9 is a flowchart showing an operation in terminal data changing in the embodiment of the present invention.

The system data sharing management system is used for each of steps including: an operation in staring-up of the LAN telephone terminal shown in FIG. 5; an operation in changing of the shared data by the LAN telephone terminal shown in FIG. 6; an operation in changing of the shared data by the terminal management device shown in FIG. 7; an operation in changing of the manager data shown in FIG. 8; and an operation in changing of the terminal data shown in FIG. 9.

First, the operation in the starting-up of the LAN telephone terminal is described by referring to FIG. 5. In FIG. 5, first, in step A1, for example the LAN telephone terminal 201 is connected to the LAN transmission line 300. Then, in step A2, the LAN telephone terminal 201 sends a request of registration through the LAN transmission line 300 to the terminal management device 100.

On the other hand, in step A3, the terminal management device 100 registers the LAN telephone terminal 201 based on the request of registration received from the LAN telephone terminal 201. Then, in step A4, the terminal management device 100 notifies success of the registration through the LAN transmission line 300 to the LAN telephone terminal 201.

Subsequently, in step A5, the LAN telephone terminal 201 sends a request of system data through the LAN transmission line 300 to the terminal management device 100.

On the other hand, the terminal management device 100 reads out then system data 400 related to the LAN telephone terminal 201 from the server database unit 120 based on the received request of system data and, in step A6, sends this system data 400 through the LAN transmission line 300 to the LAN telephone terminal 201.

Subsequently, in step A7, the LAN telephone terminal 201 downloads the system data 400. In this case, the system data 400 contains all the class data 410, 420 and 430. Then, in step A8, the LAN telephone terminal 201 writes the downloaded system data 400 in the terminal database unit 220.

Accordingly, in step A9, the LAN telephone terminal 201 can be operated as a telephone set including call control based on the system data 400.

Next, the operation in the changing of the shared data by the LAN telephone terminal is described by referring to FIG. 6. Note that this operation is performed when number allocation to the terminal line button is changed by the LAN telephone terminal 201 in normal operation.

In FIG. 6, first, in step B1, for example at the LAN telephone terminal 201, number allocation to the terminal line button is changed based on command processing by an LCD screen touching operation or a key operation. Accordingly, among the data contained in the system data 400 held in the terminal database unit 220, the class 2 data (shared data) 421 for the LAN telephone terminal 201 is updated.

Subsequently, in step B2, the LAN telephone terminal 201 uploads the updated class 2 data 421 through the LAN transmission line 300 to the terminal management device 100.

Then, the terminal management device 100 receives the class 2 data 421 for the LAN telephone terminal 201 and, in step B3, updates the class 2 data (shared data) 421 for the LAN telephone terminal 201 among the data contained in the system data 400 held in the server database unit 120. Accordingly, the class 2 data (shared data) 421 respectively held in the server database unit 120 of the terminal management device 100 and the terminal database unit 220 of the LAN telephone terminal 201 are matched with each other.

Next, the operation in the changing of the shared data by the terminal management device is described by referring to FIG. 7.

In FIG. 7, first, in step C1, the terminal management device 100 changes number allocation to the terminal line button for each or all of the LAN telephone terminals 201 to 20n by inputting a command. Accordingly, among the data contained in the system data 400 held in the server database unit 120, the class 2 data (shared data) 420 (421 to 42n) for the target LAN telephone terminals 201 to 20n is updated.

Then, in step C2, the terminal management device 100 sends the updated class 2 data 420 (421 to 42n) through the LAN transmission line 300 to the target LAN telephone terminals 201 to 20n.

Upon receiving such data, the target LAN telephone terminals 201 to 20n respectively download the class 2 data 420 from the terminal management device 100 and, in step C3, update the class 2 data (shared data) 420 among the data contained in the system data 400 held in the terminal database unit 220. Thus, the class 2 data (shared data) 421 to 42n in the server database unit 12b of the terminal management device 100 and in the terminal database unit 220 of the target LAN telephone terminals 201 to 20n are matched with each other.

Thus, the operation in the changing of the shared data by the terminal management device is completed.

Next, description is made of the operation in the changing of the manager data by referring to FIG. 8.

In FIG. 8, first, in step D1, the terminal management device 100 changes the manager data 410 by inputting a command. Accordingly, among the data contained in the system data 400 held in the server database unit 120, the class 1 data (manager data) 410 is updated.

Then, the terminal management device 100 sends the updated class 1 data 410 through the LAN transmission line 300 to each of the LAN telephone terminals 201 to 20n in case of emergency.

Normally, however, at this point of time, the updated class 1 data 410 is not sent to each of the LAN telephone terminals 201 to 20n. Then, in step D2 of restarting, each of the LAN telephone terminals 201 to 20n downloads the system data 400 containing the updated class 1 data 410 in step D3 and, in step D4, updates the class 1 data (manager data) 410 among the data contained in the system data 400 held in the terminal database unit 220.

Thus, the class 1 data (manager data) 410 in the server database unit 120 of the terminal management device 100 and in the terminal database unit 220 of each of the LAN telephone terminals 201 to 20n are matched with each other.

Thus, the operation in the changing of the manager data is completed.

Next, description is made of the operation in the changing of the terminal data by referring to FIG. 9.

In FIG. 9, in step E1, for example the LAN telephone terminal 201 changes the terminal data by using the LCD screen touching operation or a key operation to process a command. Accordingly, among the data contained in the system data 400 held in the terminal database unit 220, the class 3 data (terminal data) 430 is updated.

In this case, the LAN telephone terminal 201 does not upload the updated class 3 data 430 through the LAN transmission line 300 to the terminal management device 100.

The updated class 3 data 430 is valid until the LAN telephone terminal 201 is restarted.

Then, after having been restarted in step E2, the LAN telephone terminal 201 download the system data 400 including all the classes through the LAN transmission line 300 from the terminal management device 100 in step W3 similarly to steps A2 to A7 in the starting-up of the LAN telephone terminal described above with reference to FIG. 5.

Subsequently, in step E4, the LAN telephone terminal 201 writes the downloaded system data 400 in the terminal database unit 220.

Thus, in step E5, the LAN telephone terminal 201 is operated as a telephone set including call control based on the system data 400.

In this case, among the data contained in the system data 400 registered in the server database unit 120 of the terminal management device 100, the class 3 data (terminal data) 430 is a default value. Accordingly, the class 3 data 430 written in the terminal database unit 220 of the LAN telephone terminal 201 is also a default value, not reflecting the previously changed terminal data.

Therefore, if the terminal data at the LAN telephone terminal 201 is to be changed similarly to the previously changed terminal data, the processing of step E1 must be executed again to change the terminal data.

In this way, the operation in the changing of the terminal data is completed.

In the foregoing embodiment, reference was made to the case where the common data and the terminal data were changed by the LAN telephone terminal 201. However, the present invention is not limited to the specific embodiment and, needless to say, the common data and the terminal data can be changed by each of the other LAN telephone terminals 201 to 20n.

In the foregoing embodiment, the LAN telephone terminals 201 to 20n were used as the terminals. However, the present invention is not limited to such and, needless to say, other types of terminals or network computers may be used.

The present invention is therefore advantageous in the following respects. That is, not only the terminal management device but also each terminal can change a part of the system data other than, for example the data used for setting the entire system. Accordingly, even those other than the system manager can easily change the system data, enhancing convenience.

Moreover, by classifying the system data into the plurality of classes, and sharing only the necessary data among the data contained in the system data, it is possible to limit a changing range of the system data by the terminal management device or each terminal. As a result, it is possible to inhibit data not freely changed by the terminal management device or the terminal side, or data unnecessary to be known, from being changed.

What is claimed is:

1. A system data sharing management system in a LAN telephone system provided with a plurality of terminals connected to a LAN transmission line, and a terminal management device for managing system data of each of the terminals, comprising:
   storage unit for storing at least a part of the system data for operating the LAN telephone system as data shared by each of the terminals and the terminal management device; and
   system data changing unit for changing the shared data by each of the terminals.

2. A system data sharing management system in a LAN telephone system according to claim 1, wherein the system data is classified into manager data, shared data and terminal data: the manager data containing a part controlled to be changed only by the terminal management device, the shared data a part controlled to be changed by the terminal management device and each of the terminals, and the terminal data a part controlled to be changed only by each of the terminals.

3. A system data sharing management system in a LAN telephone system according to claim 2, wherein the manager data is for setting the entire system.

4. A system data sharing management system in a LAN telephone system according to claim 3, further comprising notification unit for notifying, when the shared data is changed by the terminal management device or each of the terminals, the changed shared data to the terminal or the terminal management device.

5. A system data sharing management system in a LAN telephone system according to claim 3, further comprising updating unit for not notifying, when the manager data is changed by the terminal management device, the changed manager data to each of the terminals, but causing the terminal to download and update the manager data in restarting of the terminal.

6. A system data sharing management system in the LAN telephone system according to claim 2, wherein the sharing data is for setting call control at each of the terminals without affecting the system data sharing management system.

7. A system data sharing management system in a LAN telephone system according to claim 2, wherein the terminal data is for carrying out setting of terminal's own without affecting the system data sharing management system and the call control.

8. A system data sharing management system in a LAN telephone system according to claim 7, wherein when the terminal device is changed by each of the terminals, the changed terminal data is not notified to the terminal management device.

9. A system data sharing management system in a LAN telephone system according to claim 7, further comprising initialization unit for causing each of the terminals to download a default value of the terminal data from the terminal management device, and initialize the terminal data in restarting.

10. A system data sharing management system in a LAN telephone system according to claim 2, further comprising notification unit for notifying, when the shared data is changed by the terminal management device or each of the terminals, the changed shared data to the terminal or the terminal management device.

11. A system data sharing management system in a LAN telephone system according to claim 2 further comprising updating unit for not notifying, when the manager data is changed by the terminal management device, the changed manager data to each of the terminals, but causing the terminal to download and update the manager data in restarting of the terminal.

12. A system data sharing management system in a LAN telephone system according to claim 2, wherein when the terminal device is changed by each of the terminals, the changed terminal data is not notified to the terminal management device.

13. A system data sharing management system in a LAN telephone system according to claim 12, further comprising initialization unit for causing each of the terminals to download a default value of the terminal data from the terminal management device, and initialize the terminal data in restarting.

14. A system data sharing management system in a LAN telephone system according to claim 2, further comprising initialization unit for causing each of the terminals to download a default value of the terminal data from the terminal management device, and initialize the terminal data in restarting.

15. A system data sharing management system in a LAN telephone system according to claim 1, further comprising notification unit for notifying, when the shared data is changed by the terminal management device or each of the terminal, the changed shared data to the terminal or the terminal management device.

16. A system data sharing management system in a LAN telephone system according to claim 1, further comprising updating unit for not notifying, when the manager data is changed by the terminal management device, the changed manager data to each of the terminals, but causing the terminal to download and update the manager data in restarting of the terminal.

17. A system data sharing management system in a LAN telephone system according to claim 1, wherein when the terminal device is changed by each of the terminals, the changed terminal data is not notified to the terminal management device.

18. A system data sharing management system in a LAN telephone system according to claim 17, further comprising initialization unit for causing each of the terminals to download a default value of the terminal data from the terminal management device, and initialize the terminal data in restarting.

19. A system data sharing management system in a LAN telephone system according to claim 1, further comprising initialization unit for causing each of the terminals to download a default value of the terminal data from the terminal management device, and initialize the terminal data in restarting.

20. A system data sharing management system in a LAN telephone system according to claim 1, further comprising initialization unit for causing each of the terminals to download a default value of the terminal data from the terminal management device, and initialize the terminal data in restarting.

21. A system data sharing management system in a LAN telephone system according to claim 1, wherein each of the terminals is a network computer.

* * * * *